(12) United States Patent
Acharya et al.

(10) Patent No.: US 6,610,424 B1
(45) Date of Patent: Aug. 26, 2003

(54) MAGNETIC RECORDING MEDIUM AND MAGNETIC STORAGE APPARATUS

(75) Inventors: B. Ramamurthy Acharya, Kawasaki (JP); E. Noel Abarra, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 134 days.

(21) Appl. No.: 09/721,097

(22) Filed: Nov. 22, 2000

(30) Foreign Application Priority Data

Apr. 7, 2000 (JP) .......................................... 2000-107077

(51) Int. Cl.⁷ ............................... G11B 5/66; G11B 5/70
(52) U.S. Cl. .............................. 428/694 TM; 428/212; 428/336; 428/900
(58) Field of Search ................ 428/694 TM, 694 TS, 428/336, 212, 900

(56) References Cited

U.S. PATENT DOCUMENTS

| | | | |
|---|---|---|---|
| 4,792,486 A | 12/1988 | Ishizaka et al. | 428/336 |
| 4,798,765 A | 1/1989 | Ishizaka et al. | 428/336 |
| 5,147,732 A | 9/1992 | Shiroishi et al. | 428/668 |
| 5,772,857 A | 6/1998 | Zhang | 204/192.2 |
| 5,820,963 A | 10/1998 | Lu et al. | 428/65.3 |
| 5,848,386 A | 12/1998 | Motoyama | 704/5 |
| 5,849,386 A | 12/1998 | Lal et al. | 428/65.3 |
| 5,851,643 A | 12/1998 | Honda et al. | 428/212 |
| 5,922,442 A | 7/1999 | Lal et al. | 428/216 |
| 5,952,097 A | 9/1999 | Zhang | 428/332 |
| 6,129,981 A * | 10/2000 | Okuyama et al. | 428/332 |
| 6,168,861 B1 | 1/2001 | Chen et al. | 428/336 |

* cited by examiner

Primary Examiner—Holly Rickman
(74) Attorney, Agent, or Firm—Greer, Burns & Crain, Ltd.

(57) ABSTRACT

A magnetic recording medium provided with a substrate and a magnetic layer disposed above the substrate, is characterized by the magnetic layer which includes an initial layer located closer to the substrate and a final layer located further away from the substrate than the initial layer. A saturation magnetization $M_{Sa}$ of the initial layer, a saturation magnetization $M_{Sb}$ of the final layer, and a saturation magnetization $M_{Stot}$ of the magnetic layer as a whole satisfies a relationship $M_{Sa}<M_{Stot}<M_{Sb}$ or $M_{Sa}>M_{Stot}>M_{Sb}$.

32 Claims, 20 Drawing Sheets

MAGNETIC RECORDING MEDIUM AND MAGNETIC STORAGE APPARATUS

BACKGROUND OF THE INVENTION

This application claims the benefit of a Japanese Patent Application No.2000-107077 filed Apr. 7, 2000, in the Japanese Patent Office, the disclosure of which is hereby incorporated by reference.

1. Field of the Invention

The present invention generally relates to magnetic recording mediums and magnetic storage apparatuses, and more particularly to a magnetic recording medium and a magnetic storage apparatus which are suited for high-density recording.

2. Description of the Related Art

The recording density of longitudinal magnetic recording mediums, such as magnetic disks, has been increasing considerably, due to the reduction of media noise and the development of magnetoresistive and high-sensitivity spin-valve heads. Recording densities above 50 Gb/in2 have recently been demonstrated for hard disks. The demand for greater recording densities for better performing computers is however showing an increasing trend imposing greater challenges for the recording mediums and other component design.

FIG. 1 is a cross sectional view showing an important part of a typical longitudinal magnetic recording medium. The magnetic recording medium is comprised of a substrate 1, a Cr or Cr-based underlayer 2, a Co-based magnetic layer 3 where information is written, and a C or DLC overlayer 4 which are stacked as shown in FIG. 1. An organic lubricant is coated on the overlayer 4.

Lowering the media noise involves writing sharper magnetic transitions in the magnetic layer 3. This is generally achieved by increasing the media coercivity, decreasing the thickness of the magnetic layer 3, decreasing the grain size and grain size distribution of the magnetic layer 3, and magnetically isolating the grains of the magnetic layer 3.

A higher signal-to-noise ratio (hereinafter simply referred to as SNR) is obtained when the grain sizes of the magnetic layer 3 are small and the distribution of the grain sizes is narrow. One approach to achieve small grain sizes for the magnetic layer 3 is to reduce the grain diameters of the underlayer 2. Using a Cr-based alloy including Mo, V, W, Ti or the like will lead to smaller grain diameters of the underlayer 2. In addition, a bi-layer underlayer structures sometimes lead to smaller grain diameters than single-layer underlayer structures. Addition of B to the Co-based alloy of the magnetic layer 3 also reduces the grain sizes of the magnetic layer 3.

However, the small grains of the magnetic layer 3 adversely affect the thermal stability of the magnetic recording medium. Normally, the thermal stability of the magnetic layer 3 is represented by how large a thermal stabilization factor $K_uV/kT$ is, where $K_u$ denotes the magnetic anisotropy, V the volume of the grain, T the temperature, and k the Boltzmann constant. In order to obtain thermally stable small grains, the magnetic anisotropy $K_u$ has to be increased.

The magnetic anisotropy field Hk is defined as $Hk=2Ku/Ms$, where Ms denotes the saturation magnetization. A large magnetic anisotropy field Hk means a large coercivity Hc at the nanosecond regime where normally, the writing of the information occurs for a high-density recording mediums with high data transfer rates. High coercivity Hc at writing frequencies puts severe limitations on the write heads, since a large write current is required in order to write information on such magnetic recording mediums. Write currents, which can be produced by write heads, are severely limited due to difficulties in developing write heads with high magnetic moment.

The overwrite performance, which is the ability to write new data over previously written data, deteriorates for magnetic recording mediums with high magnetic anisotropy field Hk, as shown in FIG. 2. FIG. 2 is a diagram showing the overwrite performance of magnetic recording mediums having various coercivities at 100 ns sweeping time. In FIG. 2, the ordinate indicates the overwrite performance OW (dB), and the abscissa indicates the coercivity Hc (Oe) at 100 ns sweeping time. As the magnetic anisotropy Ku increases to thereby increase the magnetic anisotropy field Hk, the overwrite performance becomes restricted as may be seen from FIG. 2. But such an increase in the magnetic anisotropy field Hk with increasing magnetic anisotropy Ku can be restricted or reversed, if the increasing magnetic anisotropy Ku is also accompanied by an increase in the saturation magnetization Ms.

The magnetic anisotropy Ku of the magnetic layer 3 is normally increased by adding elements such as Pt to the Co-based alloy which forms the magnetic layer 3. However, such an increase in the magnetic anisotropy Ku by the addition of Pt is inevitably accompanied by a decrease in the saturation magnetization Ms which over a range restricts the overwrite performance. Alternatively, the Co-content of the magnetic layer 3 may be increased in order to increase the magnetic anisotropy Ku. Increasing the Co-content of the magnetic layer 3 not only increases the magnetic anisotropy Ku, but also increases the saturation magnetization Ms.

The magnetic layer 3 is usually made of a CoCr alloy in which Cr helps segregating the Co grains from each other. Such segregation is very important in achieving low media noise. When producing the commonly used magnetic recording mediums having the magnetic layer 3 which is made of an alloy such as CoCrPt, CoCrTa, CoCrPtTa and CoCrPtB, targets with Cr concentrations of 18 to 26At % are used. A larger portion of the Cr stays in the grain boundaries, but still a considerable portion of the Cr remains within the grain. Further Pt of 8 to 14At % is added to obtain the necessary coercivity Hc and magnetic anisotropy Ku. The Co within the grain is thus diluted with the Cr and other additives, thereby considerably reducing the saturation magnetization Ms of the magnetic layer 3. However, for the magnetic recording medium which has the magnetic layer 3 made of a single-layer structure, such dilution of the Co is inevitable considering the segregation which is needed to obtain a high SNR.

FIG. 3 is a diagram showing a trend in increasing SNR with increasing coercivity. In FIG. 3, the ordinate indicates the SNR (dB) of the magnetic recording medium (or media SNR), and the abscissa indicates the coercivity Hc (Oe) of the recording medium (or media coercivity). The media coercivity can be increased by forming the magnetic layer 3 from a magnetic material having a high magnetic anisotropy Ku. As outlined above, the high magnetic anisotropy Ku of the magnetic material should be accompanied by an increase in the saturation magnetization Ms to have a good overwrite performance.

For a given composition, the coercivity Hc can be improved by improving the in-plane c-axis orientation of the magnetic layer 3. The improved in-plane c-axis orientation also results in an increase in remanent magnetization Mr which decreases dc-erased noise. The in-plane c-axis orientation is promoted for the magnetic layer 3 made of Co-based alloys having preferred orientations of the (11$\overline{2}$0) face grown epitaxially on the (200) face of the Cr underlayer 2 or, the (10$\overline{1}$0) face grown epitaxially on the (211) face of a NiAl underlayer 2. A lattice mismatch between the underlayer 2 and the magnetic layer 3 leads to stacking faults which may decrease the coercivity Hc. The lattice mismatch may be minimized by alloying the Cr underlayer 2 with an element such as Mo, V and W.

A few monolayers in the magnetic layer 3 may be non-magnetic due to stresses or defects in the hcp-bcc interface. In such a case, non-magnetic or slightly magnetic hcp thin intermediate layer may be used to decrease such defects and to improve the in-plane coercivity, as proposed in U.S. Pat. Nos. 5,820,963 and No. 5,848,386, for example.

A decrease in the media noise may also be achieved by decreasing a parameter Mrt, where Mr denotes the remanent magnetization and t the thickness of the magnetic layer 3. The parameter Mrt can be decreased by reducing the media thickness or by decreasing the saturation magnetization Ms of the magnetic layer 3. However, the decrease in the media thickness beyond a certain point does not decrease the media noise any further. The magnetic grains become thermally unstable, thereby decreasing the coercivity Hc and thus increasing the media noise. Thus, for a particular composition of the magnetic layer 3, there is an optimum media thickness where the SNR is a maximum. Therefore, for a particular Mrt value, it is better to have a higher saturation magnetization Ms and a smaller media thickness, than to have a lower saturation magnetization Ms and a larger media thickness combination.

As described above, there is a need to decrease the media noise in order to realize a high-density recording performance for the magnetic recording medium. There is also a need to improve the overwrite performance and to improve the thermal stability of the magnetic recording medium. In order to obtain a good overwrite performance without adversely affecting the thermal stability, however, there is a need to increase the saturation magnetization Ms of the magnetic layer. But for a magnetic recording medium having the magnetic layer with the single-layer structure, increasing the saturation magnetization Ms usually affects the intergranular interaction, thereby deteriorating the SNR performance.

SUMMARY OF THE INVENTION

Accordingly, it is a general object of the present invention to provide a novel and useful magnetic recording medium and magnetic storage apparatus, in which the problems described above are eliminated.

Another and more specific object of the present invention is to provide a magnetic recording medium and a magnetic storage apparatus, which can simultaneously improve the SNR, overwrite performance and thermal stability.

Still another object of the present invention is to provide a magnetic recording medium provided with a substrate and a magnetic layer disposed above the substrate, wherein the magnetic layer includes an initial layer located closer to the substrate and a final layer located further away from the substrate than the initial layer, a saturation magnetization $M_{Sa}$ of the initial layer, a saturation magnetization $M_{Sb}$ of the final layer, and a saturation magnetization $M_{Stot}$ of the magnetic layer as a whole satisfy a relationship $M_{Sa} < M_{Stot} < M_{Sb}$. According to the magnetic recording medium of the present invention, it is possible to simultaneously improve the SNR, overwrite performance and thermal stability.

A further object of the present invention is to provide a magnetic recording medium provided with a substrate and a magnetic layer disposed above the substrate, wherein the magnetic layer includes an initial layer located closer to the substrate and a final layer located further away from the substrate than the initial layer, a saturation magnetization $M_{Sa}$ of the initial layer, a saturation magnetization $M_{Sb}$ of the final layer, and a saturation magnetization $M_{Stot}$ of the magnetic layer as a whole satisfy a relationship $M_{Sa} > M_{Stot} > M_{Sb}$ According to the magnetic recording medium of the present invention, it is possible to simultaneously improve the SNR, overwrite performance and thermal stability.

In the magnetic recording medium, the magnetic layer as a whole may have a signal-to-noise ratio higher than that obtained solely by the initial layer and also higher than that obtained solely by the final layer.

In addition in the magnetic recording medium, the magnetic layer as a whole may have a coercivity higher than a coercivity of a medium solely made up of an equally thick initial layer and lower than a coercivity of a medium solely made up of an equally thick final layer.

In the magnetic recording medium, the initial layer may be made of a $CoCr_{x1}$ alloy where x1 denotes an At % content satisfying 15<x1<27, and the final layer may be made of a $CoCr_{x2}$ alloy where x2 denotes an At % content satisfying 10<x2<24.

Further, in the magnetic recording medium, the initial layer may be made of a $CoCrB_y$ alloy where y denotes an At % content satisfying 1<y<15, and the final layer may be made of a $CoCrB_z$ alloy where z denotes an At % content satisfying 0≦z<10.

A further object of the present invention is to provide a magnetic storage apparatus comprising a head, and at least one magnetic recording medium having a magnetic layer structure recited above. According to the magnetic storage apparatus of the present invention, it is possible to simultaneously improve the SNR, overwrite performance and thermal stability.

Other objects and further features of the present invention will be apparent from the following detailed description when read in conjunction with the accompanying drawings.

BRIEF DESCRIPTION OF THE INVENTION

DESCRIPTION OF THE PREFERRED EMBODIMENTS

A description will hereinafter be given of embodiments of the magnetic recording medium according to the present invention and the magnetic storage apparatus according to the present invention, by referring to FIG. 4 and the subsequent drawings.

Figure 1:
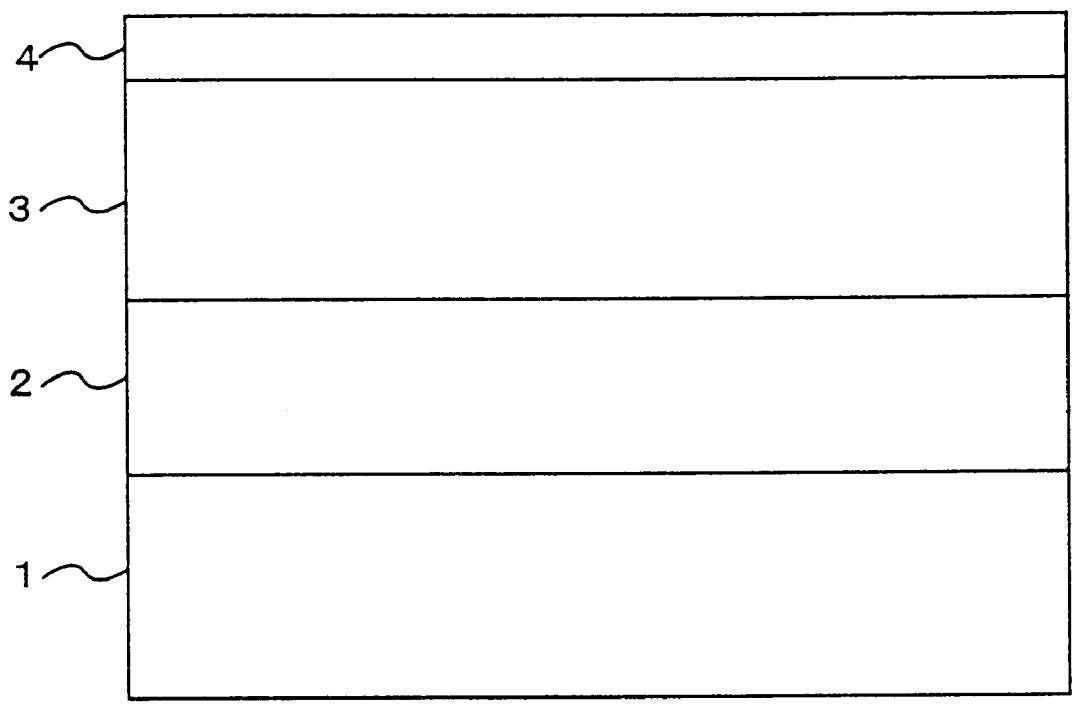
FIG. 1 is a cross sectional view showing an important part of a typical longitudinal magnetic recording medium.
Figure 2:
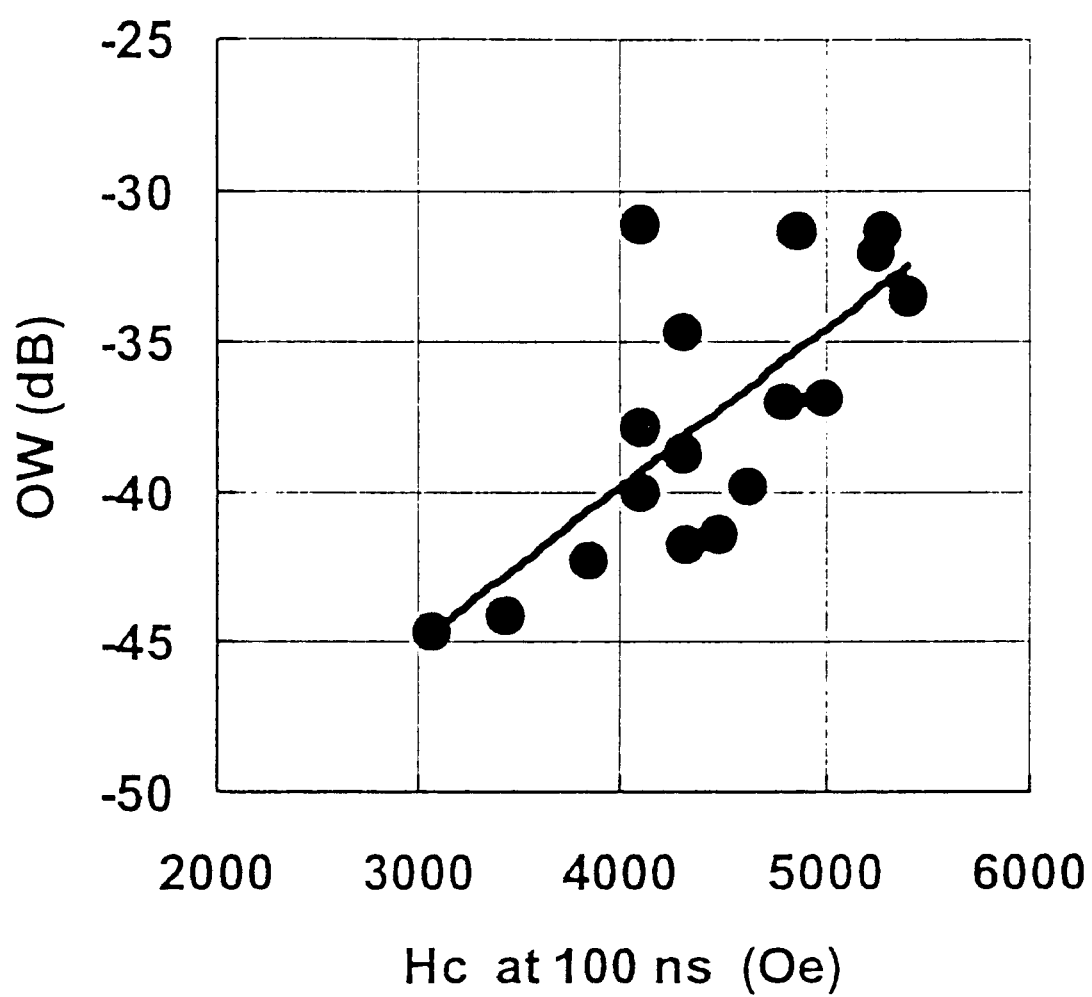
FIG. 2 is a diagram showing the overwrite performance of magnetic recording mediums having various coercivities at 100 ns sweeping time.
Figure 3:
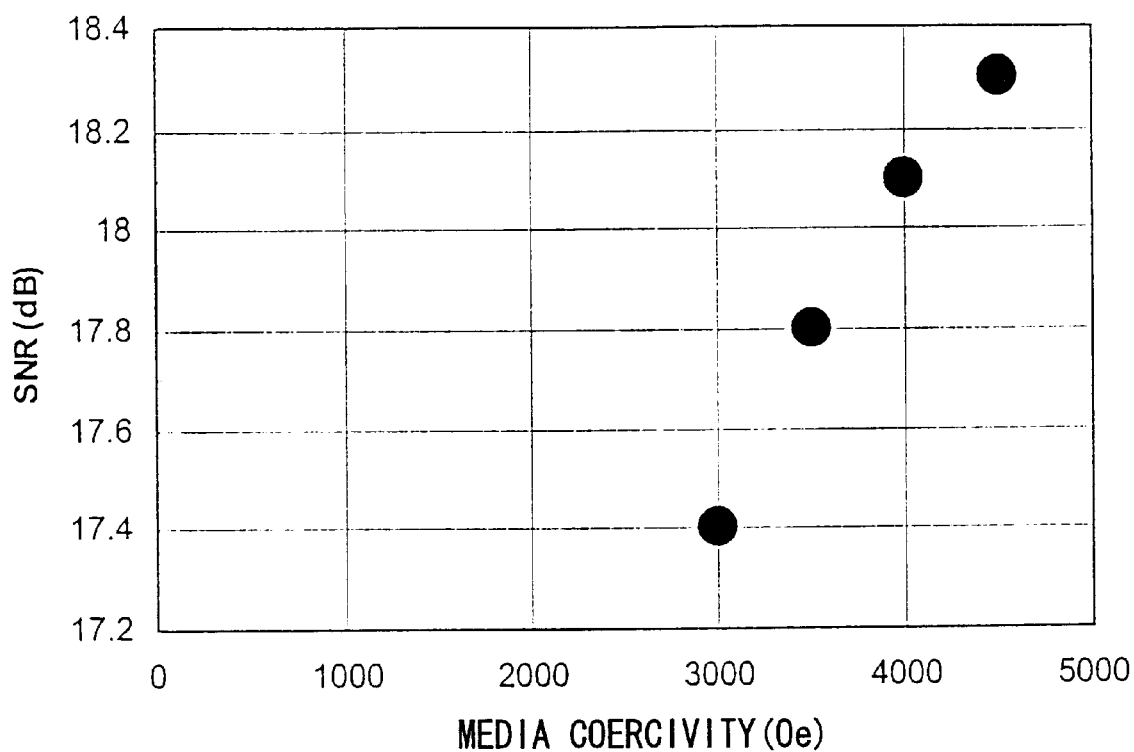
FIG. 3 is a diagram showing a trend in increasing SNR with increasing coercivity.
Figure 4:
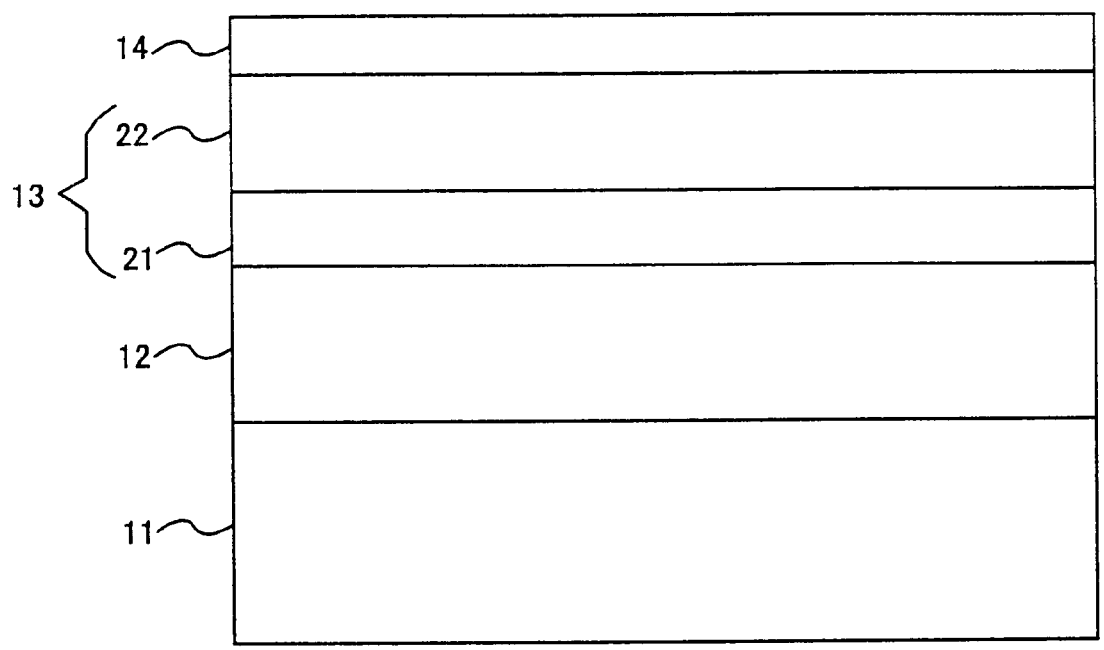
FIG. 4 is a cross sectional view showing an important part of a first embodiment of a magnetic recording medium according to the present invention.

FIG. 4 is a cross sectional view showing an important part of a first embodiment of a magnetic recording medium according to the present invention. The magnetic recording medium includes a substrate 11, a Cr or Cr-based underlayer 12, a Co-based magnetic layer 13 where information is written and a C or DLC overlayer 14 which are stacked as shown in FIG. 4. An organic lubricant is coated on the overlayer 14. In this embodiment, the magnetic layer 13 has a bi-layer structure which is formed by an initial layer 21 and a final layer 22 which is formed on the initial layer 21.

A saturation magnetization $M_{Sa}$ of the initial layer 21, a saturation magnetization $M_{Sb}$ of the final layer 22, and a saturation magnetization $M_{Stot}$ of the magnetic layer 13 as a whole, are set so as to satisfy a relationship $M_{Sa} < M_{Stot} < M_{Sb}$. As a result, the magnetic recording medium having the magnetic layer 13 has a SNR which is higher than that of the conventional magnetic recording medium having the magnetic layer with the single-layer structure corresponding to only the initial layer 21 or only the final layer 22.

In this embodiment, the initial layer 21 is made of a Co-based alloy such as CoCr, CoCrPt, CoCrTa, CoCrPtB, CoCrPtTa, CoCrPtBCu, CoCrPtTaB, CoCrPtTaNb, CoCrPtW, and alloys thereof.

On the other hand, the final layer 22 is made of a Co-based alloy such as CoCr, CoCrPt, CoCrTa, CoCrPtB, CoCrPtTa, CoCrPtBCu, CoCrPtTaB, CoCrPtTaNb, CoCrPtW, and alloys thereof.

In a case where the initial layer 21 and the final layer 22 are made of CoCr alloys, it is desirable that a $CoCr_{x1}$ alloy is used for the initial layer 21, where x1 denotes an At % content satisfying $15 < x1 < 27$, and that a $CoCr_{x2}$ alloy is used for the final layer 22, where x2 denotes an At % content satisfying $10 < x2 < 24$.

On the other hand, in a case where the initial layer 21 and the final layer 22 are made of CoCrB alloys, it is desirable that a $CoCrB_y$ alloy is used for the initial layer 21, where y denotes an At % content satisfying $1 < y < 15$, and that a $CoCrB_z$ alloy is used for the final layer 22, where z denotes an At % content satisfying $0 \leq z < 10$.

The substrate 11 may be made of an Al-based alloy plated with NiP, glass with or without a NiP plating, Si, SiC, or the like. The underlayer 12 may be made of non-magnetic NiAl, FeAl, Cr, Cr-based alloys such as CrMo, CrMoW, CrTi, CrV and CrW, or an alloy with a B2 crystal structure. In a case where the non-magnetic underlayer 12 is made of a material selected from a group consisting of Cr, CrMo, CrMoW, CrTi, CrV and CrW, the thickness of the underlayer 12 is set to approximately 1 to 25 nm. On the other hand, in a case where the non-magnetic underlayer 12 is made of NiAl or FeAl, the thickness of the underlayer 12 is set to approximately 5 to 80 nm.

Figure 5:
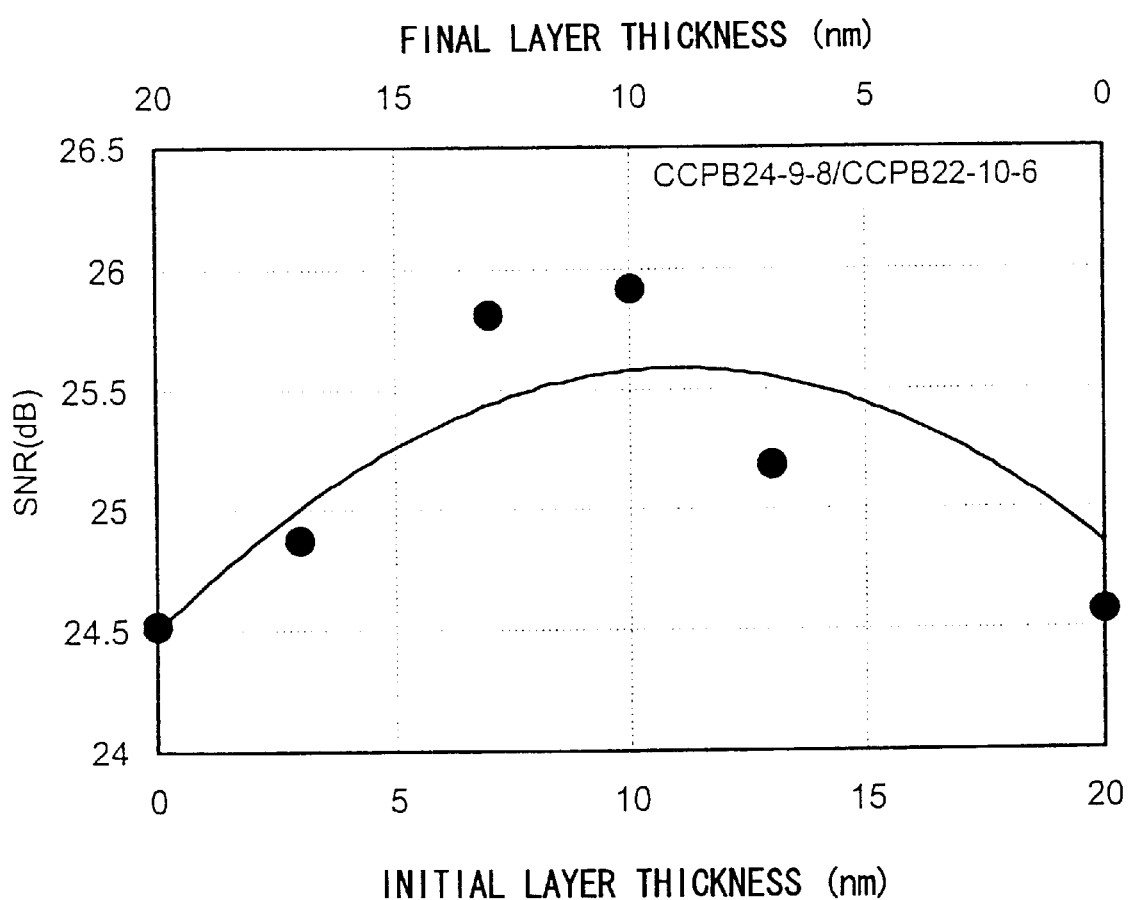
FIG. 5 is a diagram for explaining the SNR performance of the first embodiment of the magnetic recording medium.

FIG. 5 is a diagram for explaining the SNR performance of the first embodiment of the magnetic recording medium. In FIG. 5, the ordinate indicates the SNR (dB), and the abscissa indicates the thicknesses (nm) of the initial layer 21 and the final layer 22. FIG. 5 shows the SNR for a case where the initial layer 21 is made of $Co_{59}Cr_{24}Pt_9B_8$, and the final layer 22 is made of $Co_{62}Cr_{22}Pt_{10}B_6$. CCPB indicates CoCrPtB with the following numbers indicating the Cr, Pt and B concentrations in At %.

In FIG. 5, a point where the thickness of the initial layer 21 is 0 nm corresponds to the conventional magnetic layer which has the single-layer structure made of $Co_{62}Cr_{22}Pt_{10}B_6$ and having a thickness of 20 nm. Similarly, a point where the thickness of the initial layer 21 is 20 nm corresponds to the conventional magnetic layer which has the single-layer structure made of $Co_{59}Cr_{24}Pt_9B_8$ and having a thickness of 20 nm. Other points in FIG. 5 correspond to the magnetic layer 13 of this first embodiment having the bi-layer structure, which is formed by the initial layer 21 and the final layer 22, but all with a total thickness of 20 nm. Accordingly, FIG. 5 in effect shows a comparison of the SNR obtained by this first embodiment and the SNR obtained by the conventional magnetic layer having the single-layer structure. As may be seen from FIG. 5, when the initial and final layers 21 and 22 both have the thickness of 10 nm, this first embodiment shows an improvement of approximately 1.5 dB in the SNR as compared to the conventional magnetic layer having the single-layer structure.

Figure 6:
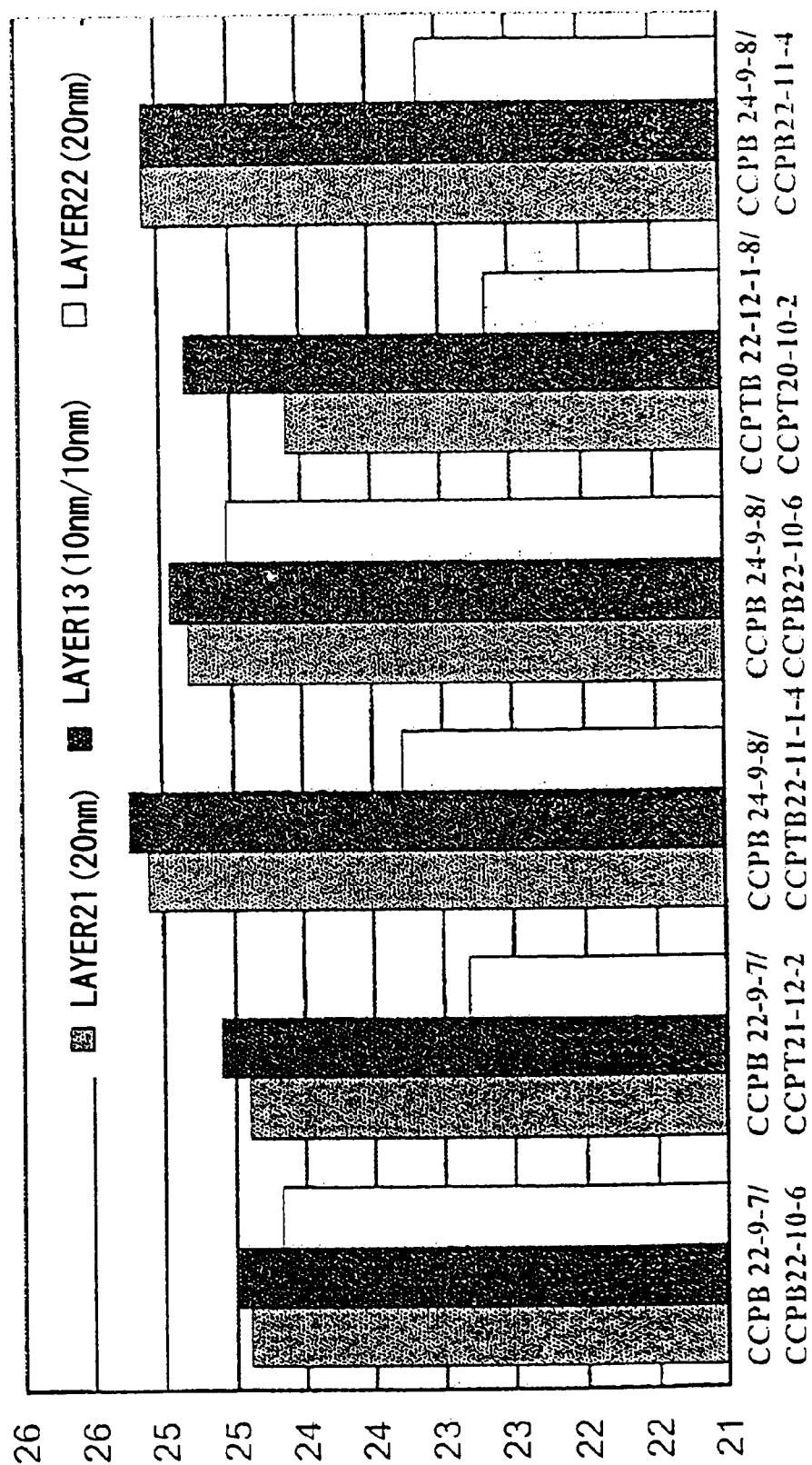
FIG. 6 is a diagram showing the SNR performances of the first embodiment of the magnetic recording medium for various magnetic layer compositions.

FIG. 6 is a diagram showing the SNR performances of the first embodiment of the magnetic recording medium for various magnetic layer compositions. In FIG. 6, the ordinate indicates the SNR (dB), and various magnetic layer compositions are shown along the abscissa. In addition, a dark shaded part indicates the SNR of this first embodiment for a case where the initial and final layers 21 and 22 both have the thickness of 10 nm, and a lightly shaded part and a non-shaded part on both sides respectively indicate cases where the magnetic layer 13 is made up solely of the initial layer 21 having the thickness of 20 nm and the magnetic layer 13 is made up solely of the final layer 22 having the thickness of 20 nm. In other words, the lightly shaded part and the non-shaded part on both sides of the dark shaded part respectively correspond to the data of the conventional magnetic layer having the single-layer structure. In FIG. 6, CCPB indicates CoCrPtB, CCPT indicates CoCrPtTa, CCPTB indicates CoCrPtTaB, and the following numbers indicate the concentrations of Cr and each of the subsequent constituent elements in At %. As may be seen from FIG. 6, the SNR obtained in this first embodiment is improved compared to that obtained in the conventional magnetic layer having the single-layer structure.

Figure 7:
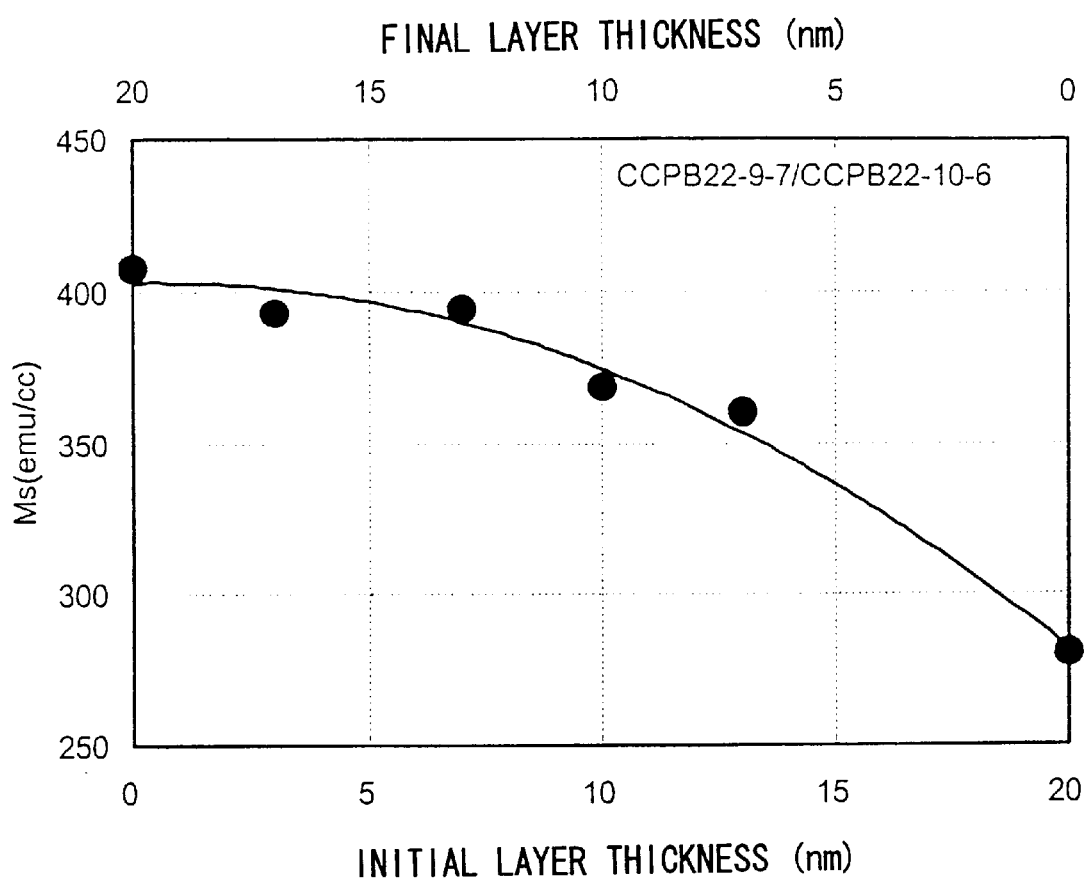
FIG. 7 is a diagram showing the saturation magnetization of the first embodiment of the magnetic recording medium.

FIG. 7 is a diagram showing the saturation magnetization of the first embodiment of the magnetic recording medium. In FIG. 7, the ordinate indicates the saturation magnetization Ms (emu/cc), and the abscissa indicates the thicknesses (nm) of the initial layer 21 and the final layer 22 which form the magnetic layer 13. The same designations are used as in FIG. 5. As may be seen from FIG. 7, the saturation magnetization Ms obtained in this first embodiment is higher than that obtained solely by the initial layer 21, that is, the conventional magnetic layer having the single-layer structure made up solely of the initial layer 21 having the thickness of 20 nm.

Figure 8:
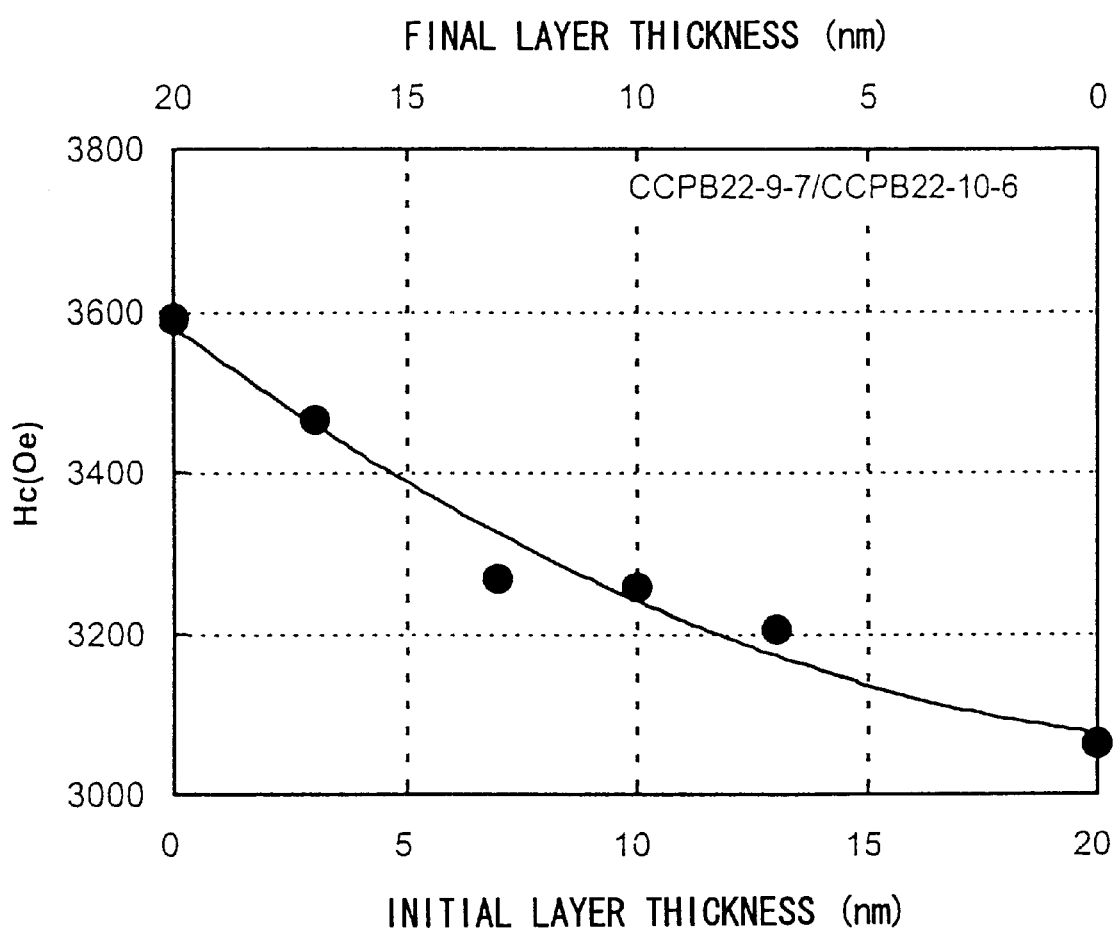
FIG. 8 is a diagram showing the coercivity of the first embodiment of the magnetic recording medium.

FIG. 8 is a diagram showing the coercivity of the first embodiment of the magnetic recording medium. In FIG. 8, the ordinate indicates the coercivity Hc (Oe), and the abscissa indicates the thicknesses (nm) of the initial layer 21 and the final layer 22 which form the magnetic layer 13. The same designations are used as in FIG. 5. As may be seen from FIG. 8, the coercivity Hc obtained in this first embodiment is higher than that obtained solely by the initial layer 21, that is, the conventional magnetic layer having the single-layer structure made up solely of the initial layer 21 having the thickness of 20 nm.

Figure 9:
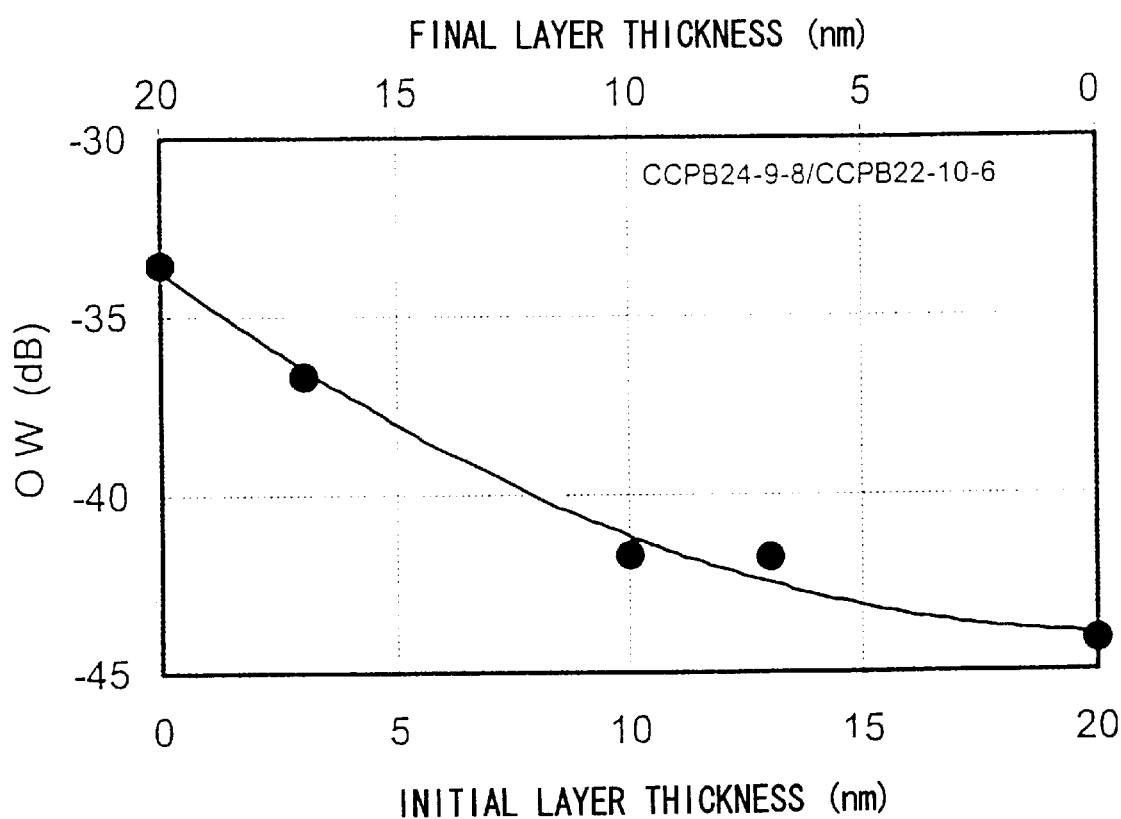
FIG. 9 is a diagram showing the overwrite performance of the first embodiment of the magnetic recording medium.

FIG. 9 is a diagram showing the overwrite performance of the first embodiment of the magnetic recording medium. In FIG. 9, the ordinate indicates the overwrite performance OW (dB), and the abscissa indicates the thicknesses (nm) of the initial layer 21 and the final layer 22 which form the magnetic layer 13. The same designations are used as in FIG. 5. As may be seen from FIG. 9, the overwrite performance OW obtained in this first embodiment is higher than that obtained solely by the final layer 22, that is, the conventional magnetic layer having the single-layer structure made up solely of the initial layer 21 having the thickness of 20 nm.

Figure 10:
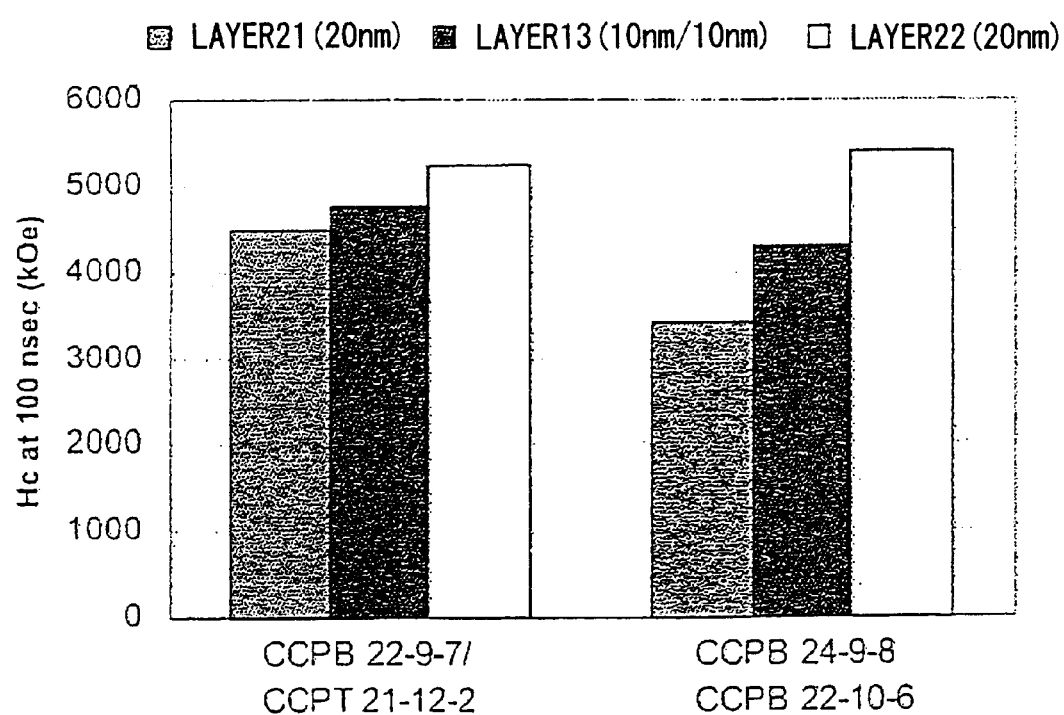
FIG. 10 is a diagram for explaining the coercivity at 100 ns of the first embodiment of the magnetic recording medium.

FIG. 10 is a diagram for explaining the coercivity at 100 ns of the first embodiment of the magnetic recording medium. In FIG. 10, the ordinate indicates the coercivity Hc (kOe) at 100 ns, and various magnetic layer compositions are shown along the abscissa. The same designations are used as in FIG. 6. As may be seen from FIG. 10, the coercivity Hc at 100 ns obtained in this first embodiment is higher than that obtained solely by the initial layer 21, that is, the conventional magnetic layer having the single-layer structure made up solely of the initial layer 21 having the thickness of 20 nm.

Figure 11:
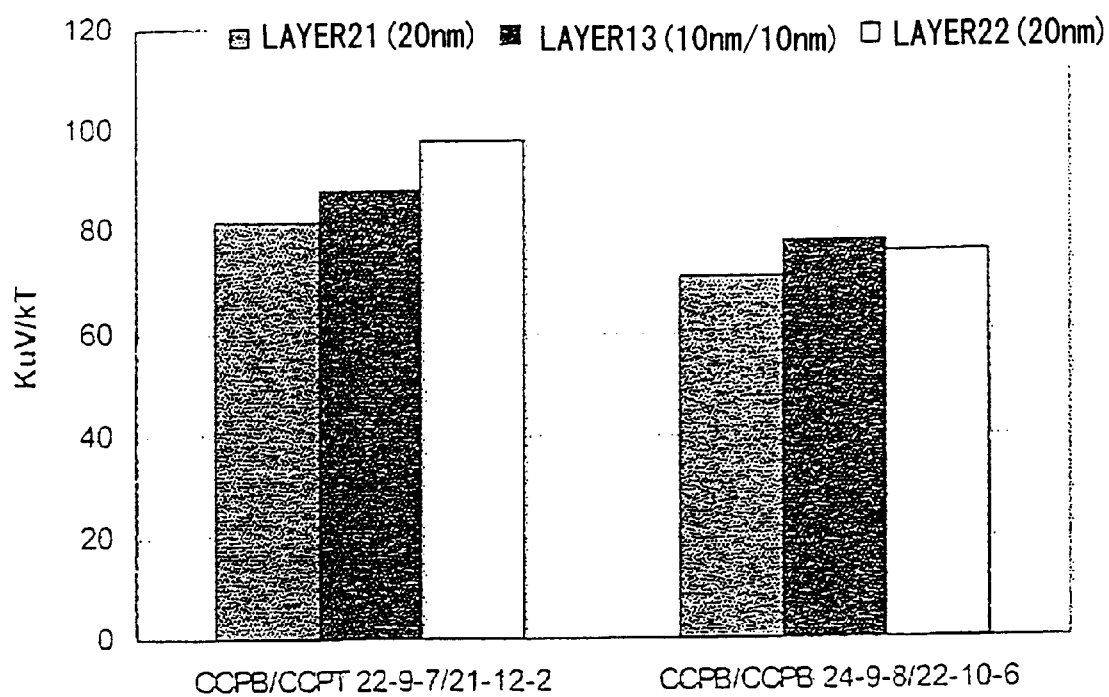
FIG. 11 is a diagram for explaining the thermal stabilization factor of the first embodiment of the magnetic recording medium.

FIG. 11 is a diagram for explaining the thermal stabilization factor of the first embodiment of the magnetic recording medium. In FIG. 11, the ordinate indicates the thermal stabilization factor KuV/kT, and various magnetic layer compositions are shown along the abscissa. The same designations are used as in FIG. 6. As may be seen from FIG. 11, the thermal stability factor KuV/kT obtained in this first embodiment is higher than that obtained solely by the initial layer 21, that is, the conventional magnetic layer having the single-layer structure made up solely of the initial layer 21 having the thickness of 20 nm.

Figure 12:
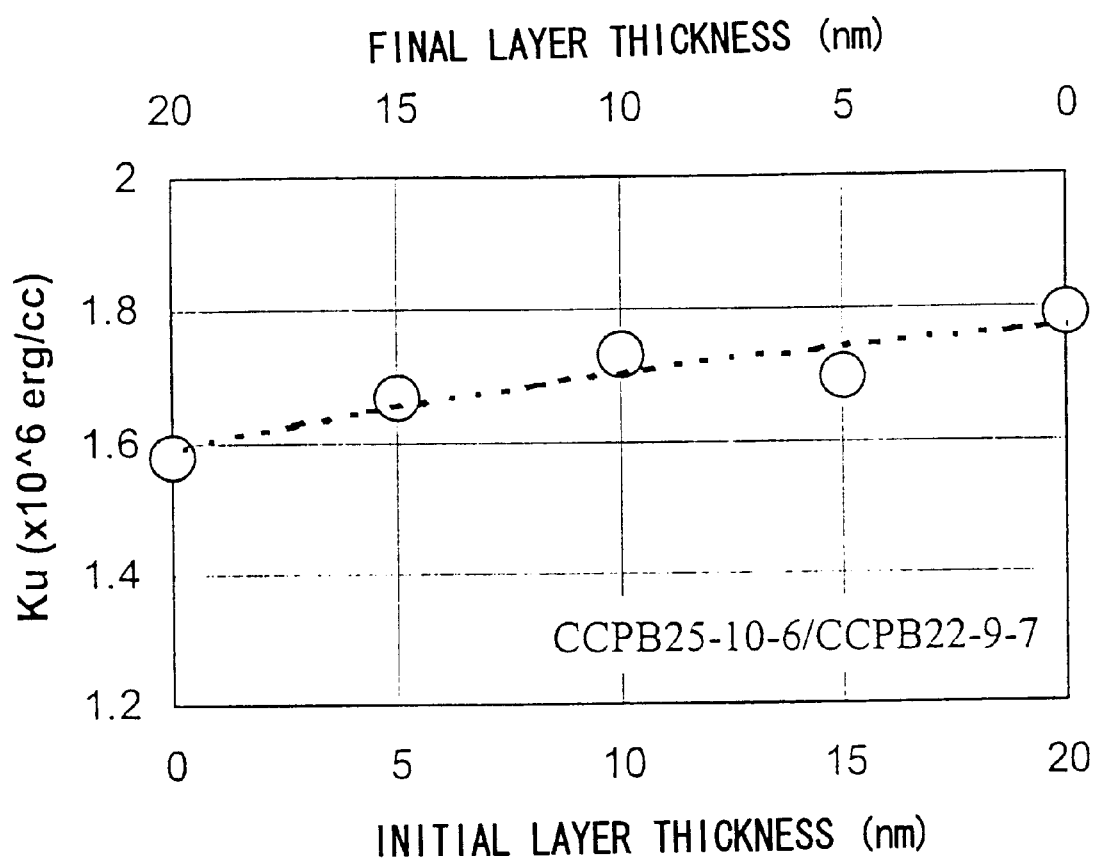
FIG. 12 is a diagram for explaining the magnetic anisotropy of the first embodiment of the magnetic recording medium.

FIG. 12 is a diagram for explaining the magnetic anisotropy of the first embodiment of the magnetic recording medium. In FIG. 12, the ordinate indicates the magnetic anisotropy Ku ($\times 10^6$ erg/cc), and the abscissa indicates the thicknesses (nm) of the initial layer 21 and the final layer 22 which form the magnetic layer 13. The same designations are used as in FIG. 5. As may be seen from FIG. 12, the magnetic anisotropy Ku obtained in this first embodiment is higher than that obtained solely by the initial layer 21, that is, the conventional magnetic layer having the single-layer structure made up solely of the initial layer 21 having the thickness of 20 nm.

The initial layer 21 has a good overwrite performance OW, but the saturation magnetization Ms and the thermal stabilization factor KuV/kT are lower than those of the final layer 22. On the other hand, the final layer 22 has high saturation magnetization Ms and thermal stabilization factor KuV/kT, but the overwrite performance OW is lower than that of the initial layer 21. By forming the magnetic layer 13 from a combination of the initial layer 21 and the final layer 22 having such characteristics, it is possible to improve the SNR as compared to the case where only the initial layer 21 or the final layer 22 is provided as conventional magnetic layer having the single-layer structure. In addition, the magnetic layer 13 formed by the combination of the initial layer 21 and the final layer 22 has overwrite performance OW and thermal stabilization factor KuV/kT which are improved over those obtained by the conventional magnetic layer having the single-layer structure and made up solely of the final layer 22.

Next, a description will be given of a second embodiment of the magnetic recording medium according to the present invention. The basic structure of this second embodiment of the magnetic recording medium is the same as that of the first embodiment shown in FIG. 4, and description and illustration thereof will be omitted.

In this second embodiment, a saturation magnetization $M_{Sa}$ of the initial layer 21, a saturation magnetization $M_{Sb}$ of the final layer 22, and a saturation magnetization $M_{Stot}$ of the magnetic layer 13 as a whole, are set so as to satisfy a relationship $M_{Sa} > M_{Stot} > M_{Sb}$. As a result, the magnetic recording medium having the magnetic layer 13 has a SNR which is higher than that of the conventional magnetic recording medium having the magnetic layer with the single-layer structure corresponding to only the initial layer 21 or only the final layer 22.

Figure 13:
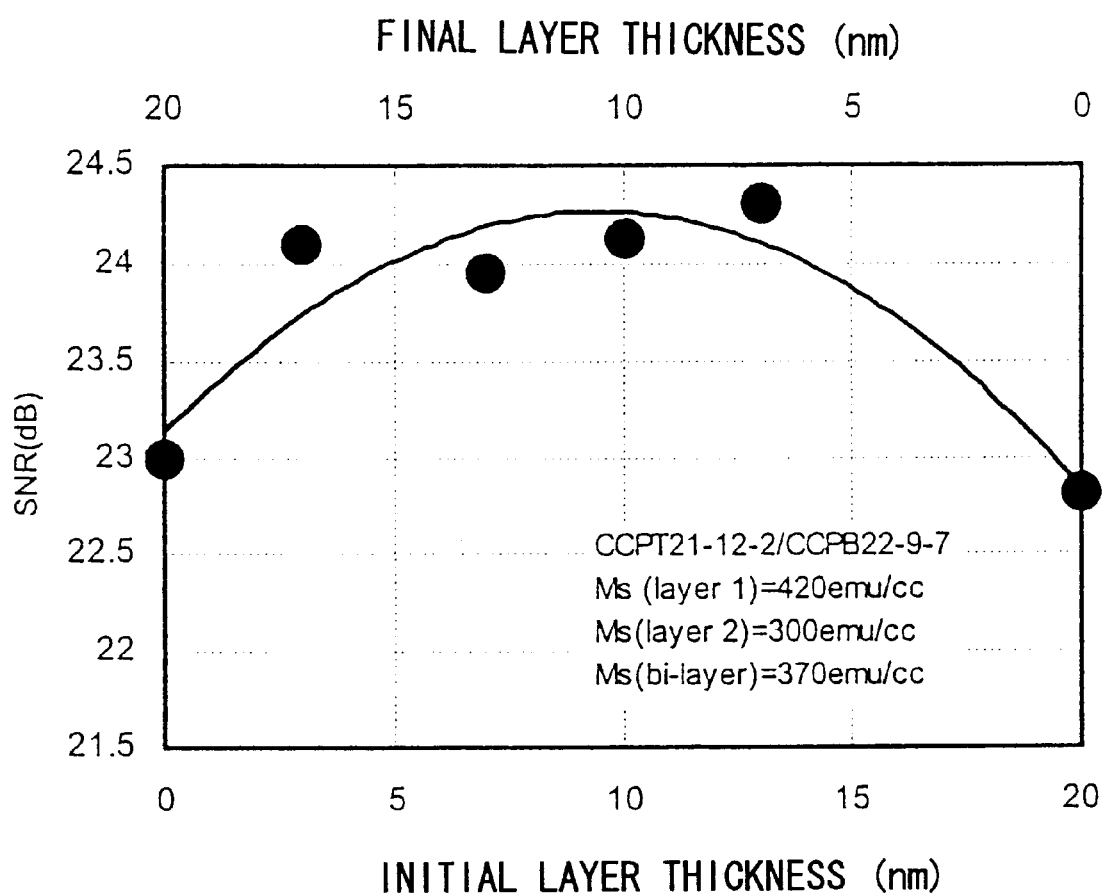
FIG. 13 is a diagram showing the SNR performance of a second embodiment of the magnetic recording medium according to the present invention.

FIG. 13 is a diagram showing the SNR performance of the second embodiment of the magnetic recording medium according to the present invention. In FIG. 13, the ordinate indicates the SNR (dB), and the abscissa indicates the thicknesses (nm) of the initial layer 21 and the final layer 22. FIG. 13 shows the SNR for a case where the initial layer 21 is made of $Co_{65}Cr_{21}Pt_{12}Ta_2$, and the final layer 22 is made of $Co_{62}Cr_{22}Pt_9B_7$. The same designations are used as in FIGS. 5 and 6. The saturation magnetization Ms of the initial layer 21 is 420 emu/cc, the saturation magnetization Ms of the final layer 22 is 300 emu/cc, and the saturation magnetization Ms of the magnetic layer 13 as a whole is 370 emu/cc.

In FIG. 13, a point where the thickness of the initial layer 21 is 0 nm corresponds to the conventional magnetic layer which has the single-layer structure made of $Co_{62}Cr_{22}Pt_9B_7$ and having a thickness of 20 nm. Similarly, a point where the thickness of the initial layer 21 is 20 nm corresponds to the conventional magnetic layer which has the single-layer structure made of $Co_{65}Cr_{21}Pt_{12}Ta_2$ and having a thickness of 20 nm. Other points in FIG. 13 correspond to the magnetic layer 13 of this second embodiment having the bi-layer structure, which is formed by the initial layer 21 and the final layer 22, but all with a total thickness of 20 nm. Accordingly, FIG. 13 in effect shows a comparison of the SNR obtained by this second embodiment and the SNR obtained by the conventional magnetic layer having the single-layer structure, similarly to FIG. 5 described above. As may be seen from FIG. 13, when the initial and final layers 21 and 22 both have the thickness of 10 nm, this second embodiment shows an improvement of approximately 1.5 dB in the SNR as compared to the conventional magnetic layer having the single-layer structure.

Figure 14:
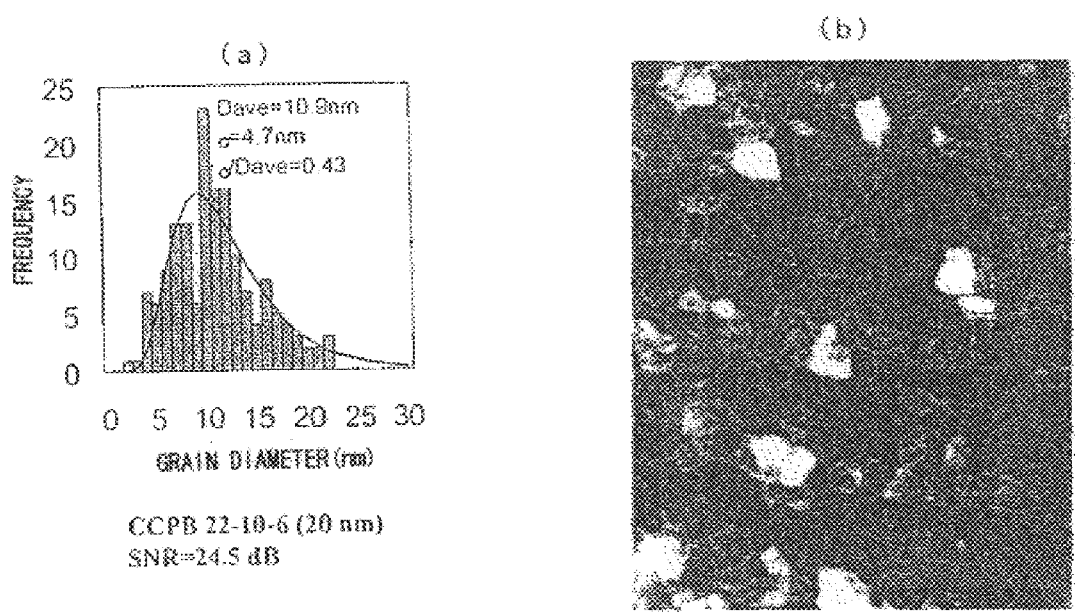
FIG. 14 is a diagram for explaining the grain diameter of the conventional magnetic layer having the single-layer structure.
Figure 15:
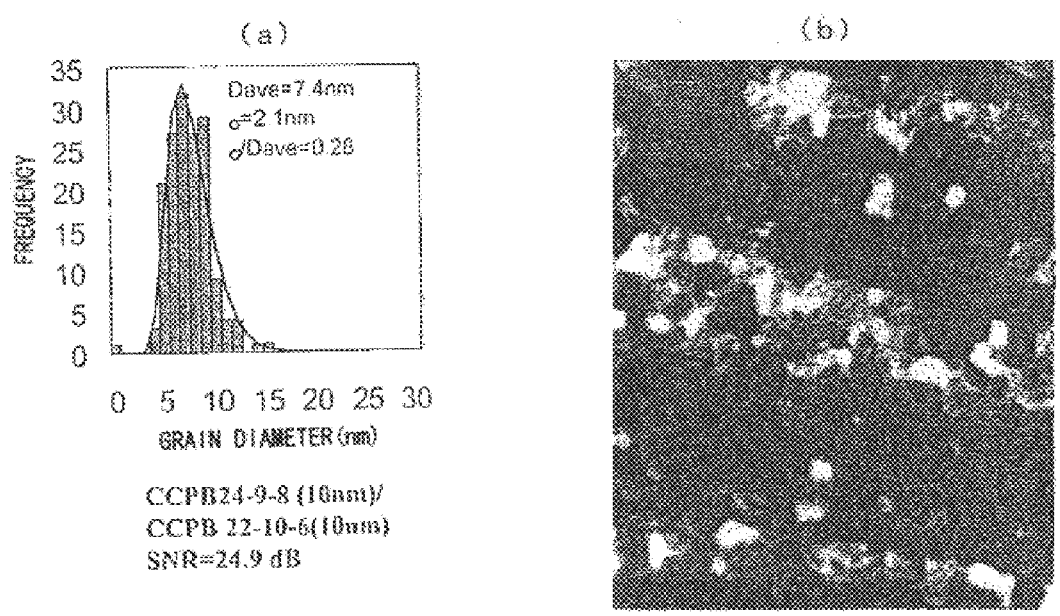
FIG. 15 is a diagram for explaining the grain diameter of the magnetic layer having the bi-layer structure of the first embodiment.

FIG. 14 is a diagram for explaining the grain diameter of the conventional magnetic layer having the single-layer structure, and FIG. 15 is a diagram for explaining the grain diameter of the magnetic layer having the bi-layer structure of the first embodiment.

In FIG. 14, (a) shows the grain diameter distribution and (b) shows the transmission electron microscopy (TEM) image of the magnetic layer having the single-layer structure made of CCPB22-10-6 with a thickness of 20 nm. In this case, the average grain diameter Dave=10.9 nm, standard deviation σ=4.7 nm, and the SNR is 24.5 dB.

In FIG. 15, (a) shows the grain diameter distribution and (b) shows the transmission electron microscopy (TEM) image of the magnetic layer having the bi-layer structure of the first embodiment made of a CCPB24-9-8 initial layer 21 with a thickness of 10 nm and a CCPB22-10-6 final layer 22 with a thickness of 10 nm. In this case, the average grain diameter Dave=7.4 nm, standard deviation σ=2.1 nm, and the SNR is 24.9 dB.

Figure 16:
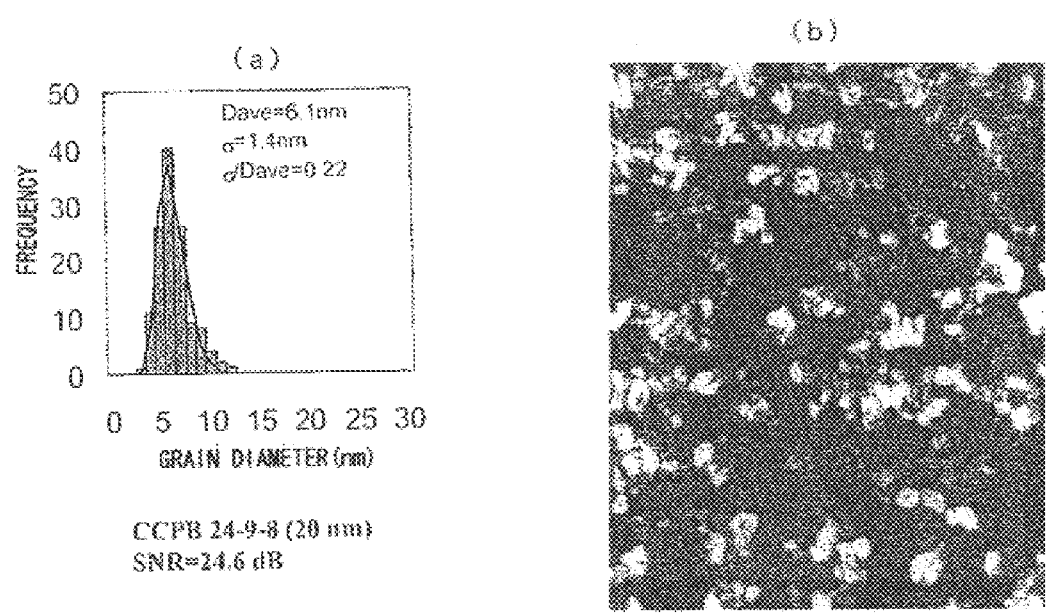
FIG. 16 is a diagram for explaining the grain diameter of the conventional magnetic layer having the single-layer structure.
Figure 17:
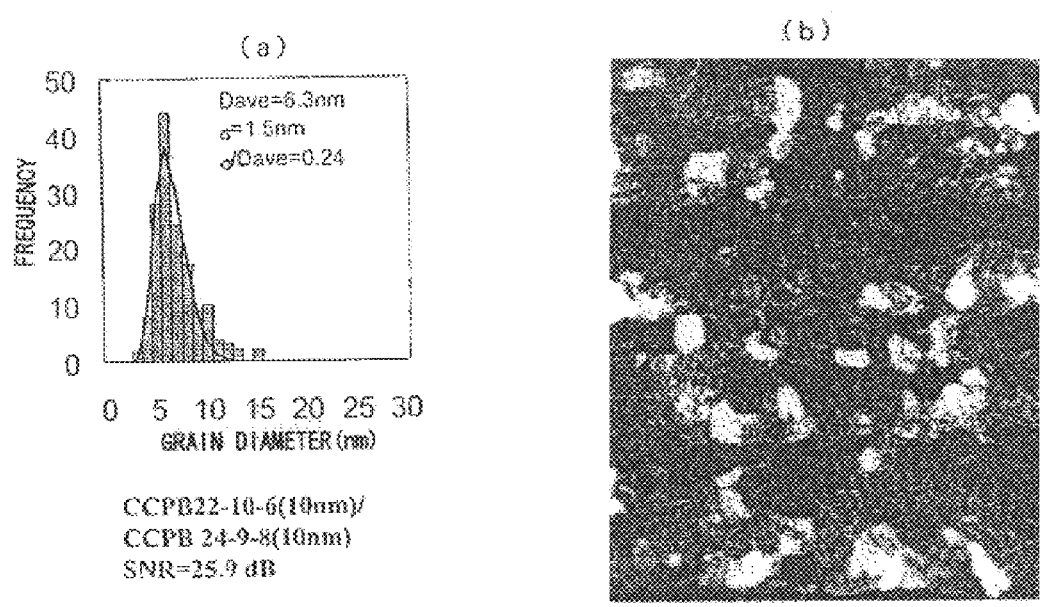
FIG. 17 is a diagram for explaining the grain diameter of the magnetic layer having the bi-layer structure of the second embodiment.

FIG. 16 is a diagram for explaining the grain diameter of the conventional magnetic layer having the single-layer structure, and FIG. 17 is a diagram for explaining the grain diameter of the magnetic layer having the bi-layer structure of the second embodiment.

In FIG. 16, (a) shows the grain diameter distribution and (b) shows the transmission electron microscopy (TEM) image of the magnetic layer having the single-layer structure made of CCPB24-9-8 with a thickness of 20 nm. In this case, the average grain diameter Dave=6.1 nm, standard deviation σ=1.4 nm, and the SNR is 24.6 dB.

In FIG. 17, (a) shows the grain diameter distribution and (b) shows the transmission electron microscopy (TEM) image of the magnetic layer having the bi-layer structure of the second embodiment made of a CCPB22-10-6 initial layer 21 with a thickness of 10 nm and a CCPB24-9-8 final layer 22 with a thickness of 10 nm. In this case, the average grain diameter Dave=6.3 nm, standard deviation σ=1.5 nm, and the SNR is 25.9 dB.

It may be seen from FIGS. 14 through 17 that the first and second embodiments can bring out the advantageous features of both the initial and final layers 21 and 22.

Figure 18:
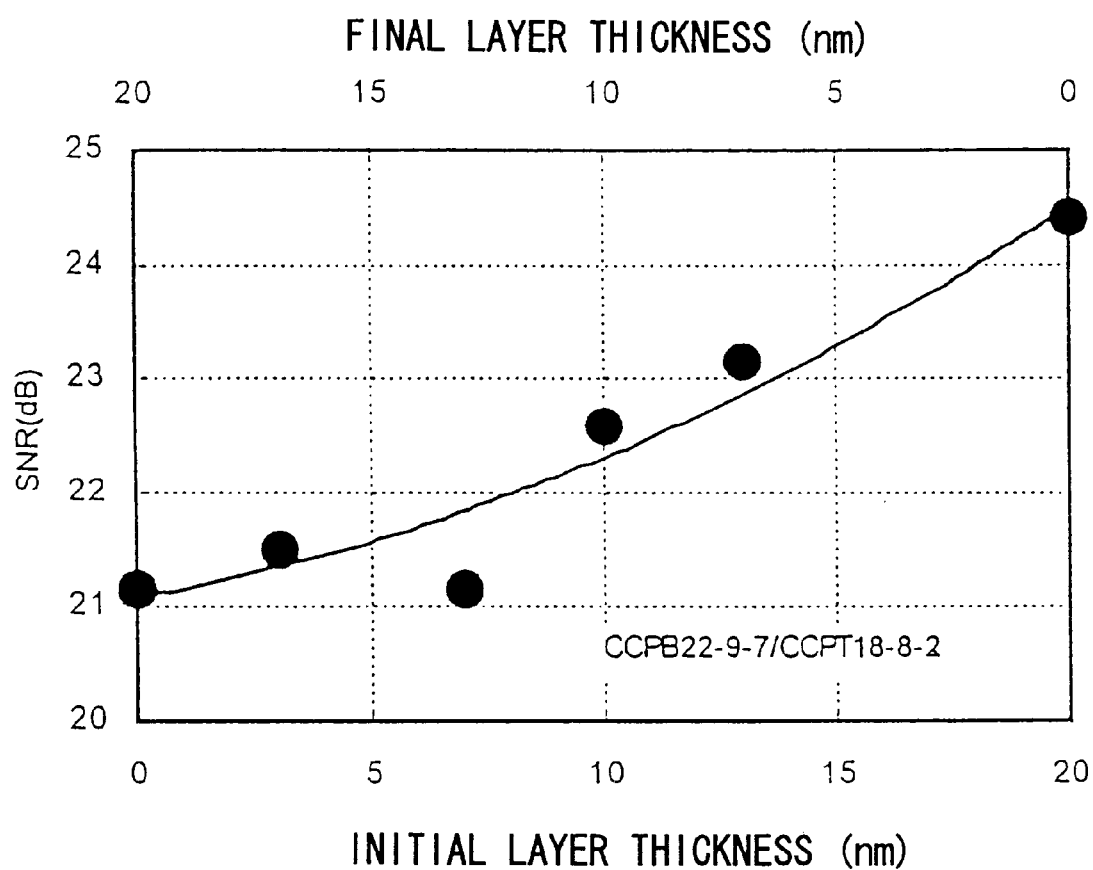
FIG. 18 is a diagram for explaining the differences in the characteristics obtained by the present invention and the prior art magnetic recording medium having the magnetic layer with a bi-layer structure.

FIG. 18 is a diagram for explaining the differences in the characteristics obtained by the present invention and the prior art magnetic recording medium having the magnetic layer with a bi-layer structure.

For example, magnetic recording mediums proposed in U.S. Pat. No. 5,772,857 and U.S. Pat. No. 5,952,097 have a magnetic layer with a bi-layer structure. However, such a bi-layer structure is made of a CoCrTa initial layer and a CoCrPtTa final layer, for example, and are not constructed to improve the SNR of the bi-layer relative to both the initial and final layers. FIG. 18 shows the SNR obtained by the magnetic layer having the bi-layer structure proposed in the U.S. Pat. No. 5,772,857 and U.S. Pat. No. 5,952,097. As may be seen from FIG. 18, the SNR obtained is an average value between the SNRs of the initial and final layers, and the SNR obtained is not improved relative to both the SNRs of the initial and final layers. Therefore, the bi-layer structure proposed in the U.S. Pat. No. 5,772,857 and U.S. Pat. No. 5,952,097 is completely different from the bi-layer structure employed in the present invention.

Figure 19:
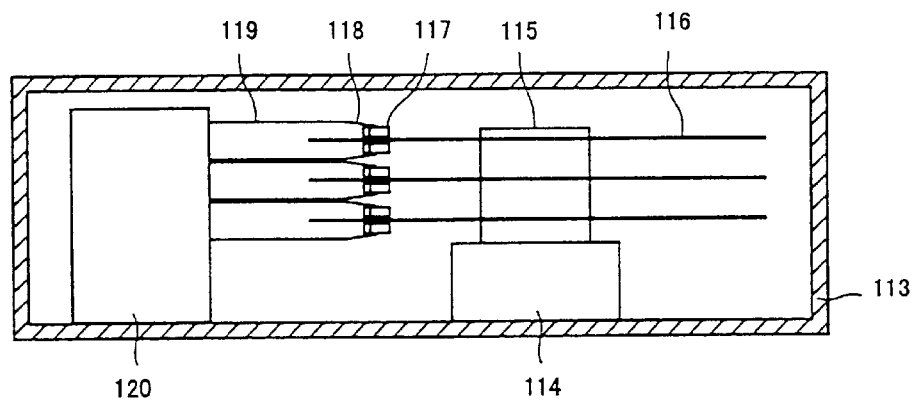
FIG. 19 is a cross sectional view showing an important part of an embodiment of a magnetic storage apparatus according to the present invention.

Next, a description will be given of an embodiment of a magnetic storage apparatus according to the present invention, by referring to FIGS. 19 and 20. FIG. 19 is a cross sectional view showing an important part of this embodiment of the magnetic storage apparatus according to the present invention, and FIG. 20 is a plan view showing the important part of this embodiment of the magnetic storage apparatus.

Figure 20:
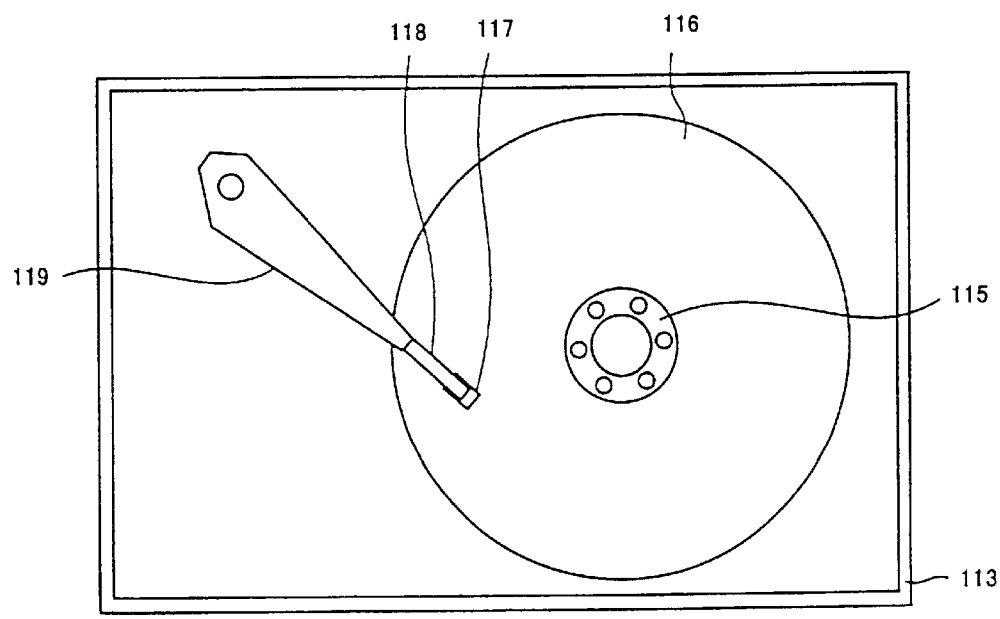
FIG. 20 is a plan view showing the important part of the embodiment of the magnetic storage apparatus.

As shown in FIGS. 19 and 20, the magnetic storage apparatus generally includes a housing 113. A motor 114, a hub 115, a plurality of magnetic recording mediums 116, a plurality of recording and reproducing (read and write) heads 117, a plurality of suspensions 118, a plurality of arms 119, and an actuator unit 120 are provided within the housing 113. The magnetic recording mediums 116 are mounted on the hub 115 which is rotated by the motor 114. The recording and reproducing head 117 is made up of a reproducing head such as a MR or GMR head, and a recording head such as an inductive head. Each recording and reproducing head 117 is mounted on the tip end of a corresponding arm 119 via the suspension 118. The arms 119 are moved by the actuator unit 120. The basic construction of this magnetic storage apparatus is known, and a detailed description thereof will be omitted in this specification.

This embodiment of the magnetic storage apparatus is characterized by the magnetic recording mediums 116. Each magnetic recording medium 116 has the structure of any of the embodiments of the magnetic recording medium described above, or the modification of the embodiments described hereunder. Of course, the number of magnetic recording mediums 116 is not limited to three, and only one, two or four or more magnetic recording mediums 116 may be provided.

The basic construction of the magnetic storage apparatus is not limited to that shown in FIGS. 19 and 20. In addition, the magnetic recording medium used in the present invention is not limited to a magnetic disk.

Figure 21:
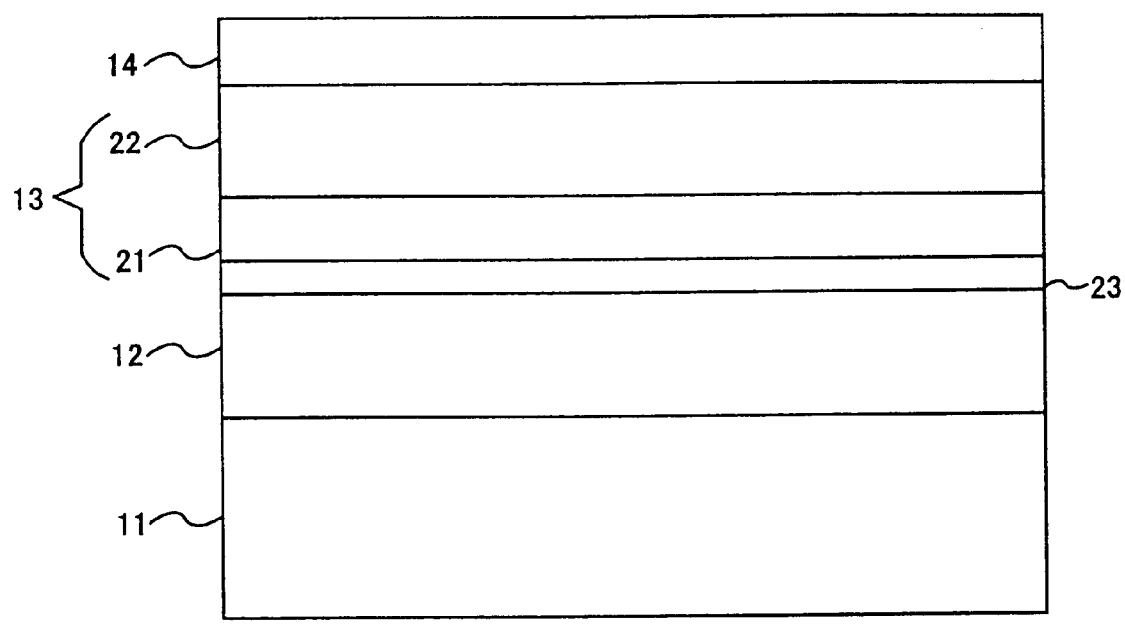
FIG. 21 is a cross sectional view showing an important part of a modification of the first and second embodiments of the magnetic recording medium.

FIG. 21 is a cross sectional view showing an important part of a modification of the first and second embodiments of the magnetic recording medium. In FIG. 21, those parts which are the same as those corresponding parts in FIG. 4 are designated by the same reference numerals, and a description thereof will be omitted.

This modification may be applied to each of the first and second embodiments of the magnetic recording medium described above. As shown in FIG. 21, this modification additionally includes an intermediate layer 23 which is provided between the underlayer 12 and the initial layer 21 of the magnetic layer 13. The intermediate layer 23 is made of a CoCr-based alloy, for example, and has a thickness of approximately 1 to 5 nm. The intermediate layer 23 may also be made of a hcp non-magnetic or slightly magnetic material. The provision of the intermediate layer 23 helps increase the coercivity Hc and reduce the media noise.

Further, the present invention is not limited to these embodiments, but various variations and modifications may be made without departing from the scope of the present invention.

What is claimed is:

1. A magnetic recording medium comprising: a substrate; and a magnetic layer disposed above the substrate,
   wherein said magnetic layer includes an initial layer located closer to the substrate and a final layer located further away from the substrate than the initial layer, and
   a saturation magnetization $M_{Sa}$ of the initial layer, a saturation magnetization $M_{Sb}$ of the final layer, and a saturation magnetization $M_{Stot}$ of the magnetic layer as a whole satisfy a relationship $M_{Sa}<M_{Stot}<M_{Sb}$,
   said initial layer is made of a $CoCrB_y$ alloy where y denotes an At % content satisfying 1<y<15, and said final layer is made of a $CoCrB_z$ alloy where z denotes an At % content satisfying 0≦z<10.

2. The magnetic recording medium as claimed in claim 1, wherein said magnetic layer as a whole has a signal-to-noise ratio higher than that obtained solely by the initial layer and also higher than that obtained solely by the final layer.

3. The magnetic recording medium as claimed in claim 1, wherein said magnetic layer as a whole has a coercivity higher than a coercivity of a medium solely made up of an equally thick initial layer and lower than a coercivity of a medium solely made up of an equally thick final layer.

4. The magnetic recording medium as claimed in claim 1, wherein said initial layer has a thickness in a range of 1 to 10 nm, and said final layer has a thickness in a range of 1 to 10 nm.

5. The magnetic recording medium as claimed in claim 1, wherein said initial layer is made of a $CoCr_{x1}B_{y1}$ alloy where x1 denotes an At % content satisfying 15<x1<27 and y1 denotes an At % content satisfying 1<y1<15, and said final layer is made of a $CoCr_{x2}B_{y2}$ alloy where x2 denotes an At % content satisfying 10<x2<24 and y2 denotes an At % content satisfying 0≦y2<10.

6. The magnetic recording medium as claimed in claim 1, wherein said magnetic layer as a whole has a thermal stabilization factor KuV/kT higher than that of a single layer solely made of the initial layer, where Ku denotes magnetic anisotropy, V denotes volume of grain, T denotes temperature, and k denotes Boltzmann constant.

7. The magnetic recording medium as claimed in claim 1, wherein said magnetic layer has a grain diameter smaller than that of a layer made up solely of the final layer and having a thickness equal to a total thickness of the magnetic layer.

8. The magnetic recording medium as claimed in claim 1, wherein said initial layer is made of a material selected from a group consisting of $CoCrB_y$, $CoCrTaB_y$, $CoCrPtB_y$, $CoCrPtB_yCu$, $CoCrPtTaB_y$ and alloys thereof, and said final layer is made of a material selected from a group consisting of $CoCrB_z$, $CoCrTaB_z$, $CoCrPtB_z$, $CoCrPtB_zCu$, $CoCrPtTaB_z$, $CoCrPtWB_z$, $CoCrPtTaNbB_z$ and alloys thereof.

9. A magnetic recording medium provided with a substrate and a magnetic layer disposed above the substrate, characterized in that:
   said magnetic layer includes an initial layer located closer to the substrate and a final layer located further away from the substrate than the initial layer,
   a saturation magnetization $M_{Sa}$ of the initial layer, a saturation magnetization $M_{Sb}$ of the final layer, and a saturation magnetization $M_{Stot}$ of the magnetic layer as a whole satisfy a relationship $M_{Sa}>M_{Stot}>M_{Sb}$,
   wherein said magnetic layer as a whole has a signal-to-noise ratio higher than that obtained solely by the initial layer and also higher than that obtained solely by the final layer.

10. A magnetic recording medium provided with a substrate and a magnetic layer disposed above the substrate, characterized in that:
    said magnetic layer includes an initial layer located closer to the substrate and a final layer located further away from the substrate than the initial layer,
    a saturation magnetization $M_{Sa}$ of the initial layer, a saturation magnetization $M_{Sb}$ of the final layer, and a saturation magnetization $M_{Stot}$ of the magnetic layer as a whole satisfy a relationship $M_{Sa}>M_{Stot}>M_{Sb}$,
    wherein said magnetic layer as a whole has a coercivity higher than a coercivity of a medium solely made of an equally thick initial layer and lower than a coercivity of a medium solely made of an equally thick final layer.

11. The magnetic recording medium as claimed in claim 9, wherein said initial layer has a thickness in a range of 1 to 10 nm, and said final layer has a thickness in a range of 1 to 10 nm.

12. The magnetic recording medium as claimed in claim 9, wherein said initial layer is made of a $CoCr_{x1}$ alloy where x1 denotes an At % content satisfying 15<x1<27, and said final layer is made of a $CoCr_{x2}$ alloy where x denotes an At % content satisfying 10<x2<24.

13. A magnetic recording medium provided with a substrate and a magnetic layer disposed above the substrate, characterized in that:
    said magnetic layer includes an initial layer located closer to the substrate and a final layer located further away from the substrate than the initial layer,
    a saturation magnetization $M_{Sa}$ of the initial layer, a saturation magnetization $M_{Sb}$ of the final layer, and a saturation magnetization $M_{Stot}$ of the magnetic layer as a whole satisfy a relationship $M_{Sa}>M_{Stot}>M_{Sb}$,
    wherein said initial layer is made of a $CoCrB_y$ alloy where y denotes an At % content satisfying 1<y<15, and said final layer is made of a $CoCrB_z$ alloy where z denotes an At % content satisfying 0≦z<10.

14. The magnetic recording medium as claimed in claim 9, wherein said magnetic layer as a whole has a thermal stabilization factor KuV/kT higher than that of a single layer solely made of the initial layer, where Ku denotes magnetic anisotropy, V denotes volume of grain, T denotes temperature, and k denotes Boltzmann constant.

15. A magnetic recording medium provided with a substrate and a magnetic layer disposed above the substrate, characterized in that:
    said magnetic layer includes an initial layer located closer to the substrate and a final layer located further away from the substrate than the initial layer,
    a saturation magnetization $M_{Sa}$ of the initial layer, a saturation magnetization $M_{Sb}$ of the final layer, and a saturation magnetization $M_{Stot}$ of the magnetic layer as a whole satisfy a relationship $M_{Sa}>M_{Stot}>M_{Sb}$,
    wherein said magnetic layer has a gain diameter smaller than that of a layer made up solely of the final layer and having a thickness equal to a total thickness of the magnetic layer.

16. The magnetic recording medium as claimed in claim 9, wherein said initial layer and said final layer are respectively made of a material selected from a group consisting of CoCr, CoCrTa, CoCrPt, CoCrPtB, CoCrPtBCu, CoCrPtTa, CoCrPtTaB, CoCrPtW, CoCrPtTaNb and alloys thereof.

17. A magnetic storage apparatus comprising:
a head; and
at least one magnetic recording medium provided with a substrate and a magnetic layer disposed above the substrate,
wherein said magnetic layer includes an initial layer located closer to the substrate and a final layer located further away from the substrate than the initial layer, and
a saturation magnetization $M_{Sa}$ of the initial layer, a saturation magnetization $M_{Sb}$ of the final layer, and a saturation magnetization $M_{Stot}$ of the magnetic layer as a whole satisfy a relationship $M_{Sa}<M_{Stot}<M_{Sb}$ or $M_{Sa}>M_{Stot}>M_{Sb}$,
said initial layer being made of a $CoCrB_y$ alloy where y denotes an At % content satisfying 1<y<15, and said final layer is made of a $CoCrB_z$ alloy where z denotes an At % content satisfying 0≦z<10.

18. The magnetic storage apparatus as claimed in claim 17, wherein said magnetic layer as a whole has a signal-to-noise ratio higher than that obtained solely by the initial layer and also higher than that obtained solely by the final layer.

19. The magnetic recording medium as claimed in claim 10 wherein said initial layer has a thickness in a range of 1 to 10 nm, and said final layer has a thickness in a range of 1 to 10 nm.

20. The magnetic recording medium as claimed in claim 10, wherein said initial layer is made of a $CoCr_{x1}$ alloy where x1 denotes an At % content satisfying 15<x1<27, and said final layer is made of a $CoCr_{x2}$ alloy where x2 denotes an At % content satisfying 10<x2<24.

21. The magnetic recording medium as claimed in claim 10, wherein said magnetic layer as a whole has a thermal stabilization factor KuV/kT higher than that of a single layer solely made of the initial layer, where Ku denotes magnetic anisotropy, V denotes volume of grain, T denotes temperature, and k denotes Boltzmann constant.

22. The magnetic recording medium as claimed in claim 10, wherein said initial layer and said final layer are respectively made of a material selected from a group consisting of CoCr, CoCrTa, CoCrPt, CoCrPtB, CoCrPtBCu, CoCrPtTa, CoCrPtTaB, CoCrPtW, CoCrPtTaNb and alloys thereof.

23. The magnetic recording medium as claimed in claim 13, wherein said initial layer has a thickness in a range of 1 to 10 nm, and said final layer has a thickness in a range of 1 to 10 nm.

24. The magnetic recording medium as claimed in claim 13, wherein said magnetic layer as a whole has a thermal stabilization factor KuV/kT higher than that of a single layer solely made of the initial layer, where Ku denotes magnetic anisotropy, V denotes volume of grain, T denotes temperature, and k denotes Boltzmann constant.

25. The magnetic recording medium as claimed in claim 15, wherein said initial layer has a thickness in a range of 1 to 10 nm, and said final layer has a thickness in a range of 1 to 10 nm.

26. The magnetic recording medium as claimed in claim 15, wherein said initial layer is made of a $CoCr_{x1}$ alloy where x1 denotes an At % content satisfying 15<x1<27, and said final layer is made of a $CoCr_{x2}$ alloy where x2 denotes an At % content satisfying 10<x2<24.

27. The magnetic recording medium as claimed in claim 15, wherein said magnetic layer as a whole has a thermal stabilization factor KuV/kT higher than that of a single layer solely made of the initial layer, where Ku denotes magnetic anisotropy, V denotes volume of grain, T denotes temperature, and k denotes Boltzmann constant.

28. The magnetic recording medium as claimed in claim 15, wherein said initial layer and said final layer are respectively made of a material selected from a group consisting of CoCr, CoCrTa, CoCrPt, CoCrPtB, CoCrPtBCu, CoCrPtTa, CoCrPtTaB, CoCrPtW, CoCrPtTaNb, and alloys thereof.

29. A magnetic storage apparatus comprising:
a head; and
at least one magnetic recording medium provided with a substrate and a magnetic layer disposed above the substrate,
wherein said magnetic layer includes an initial layer located closer to the substrate and a final layer located further away from the substrate than the initial layer,
a saturation magnetization $M_{Sa}$ of the initial layer, a saturation magnetization $M_{Sb}$ of the final layer, and a saturation magnetization $M_{Stot}$ of the magnetic layer as a whole satisfy a relationship $M_{Sa}>M_{Stot}>M_{Sb}$, and
said magnetic layer as a whole has a signal-to-noise ratio higher than that obtained solely by the initial layer and also higher than that obtained solely by the final layer.

30. A magnetic storage apparatus comprising:
a head; and
at least one magnetic recording medium provided with a substrate and a magnetic layer disposed above the substrate,
wherein said magnetic layer includes an initial layer located closer to the substrate and a final layer located further away from the substrate than the initial layer,
a saturation magnetization $M_{Sa}$ of the initial layer, a saturation magnetization $M_{Sb}$ of the final layer, and a saturation magnetization $M_{Stot}$ of the magnetic layer as a whole satisfy a relationship $M_{Sa}>M_{Stot}>M_{Sb}$, and
said magnetic layer as a whole has a coercivity higher than a coercivity of a medium solely made of an equally thick initial layer and lower than a coercivity of a medium solely made of an equally thick final layer.

31. A magnetic storage apparatus comprising:
a head; and
at least one magnetic recording medium provided with a substrate and a magnetic layer disposed above the substrate,
wherein said magnetic layer includes an initial layer located closer to the substrate and a final layer located further away from the substrate than the initial layer,
a saturation magnetization $M_{Sa}$ of the initial layer, a saturation magnetization $M_{Sb}$ of the final layer, and a saturation magnetization $M_{Stot}$ of the magnetic layer as a whole satisfy a relationship $M_{Sa}>M_{Stot}>M_{Sb}$, and
said initial layer is made of a $CoCrB_y$ alloy where y denotes an At % content satisfying 1<y<15, and said final layer is made of a $CoCrB_z$ alloy where z denotes an At % content satisfying $0 \leq z < 10$.

32. A magnetic storage apparatus comprising:

a head; and at least one magnetic recording medium provided with a substrate and a magnetic layer disposed above the substrate, wherein said magnetic layer includes an initial layer located closer to the substrate and a final layer located further away from the substrate than the initial layer, a saturation magnetization $M_{Sa}$ of the initial layer, a saturation magnetization $M_{Sb}$ of the final layer, and a saturation magnetization $M_{Stot}$ of the magnetic layer as a whole satisfy a relationship $M_{Sa} > M_{Stot} > M_{Sb}$, and said magnetic layer has a grain diameter smaller than that of a layer made up solely of the final layer and having a thickness equal to a total thickness of the magnetic layer.

* * * * *

UNITED STATES PATENT AND TRADEMARK OFFICE
CERTIFICATE OF CORRECTION

PATENT NO.    : 6,610,424 B1
DATED         : August 26, 2003
INVENTOR(S)   : Acharya et al.

It is certified that error appears in the above-identified patent and that said Letters Patent is hereby corrected as shown below:

Column 12,
Line 31, delete "x" and insert -- x2 --.
Line 64, delete "gain" and insert -- grain --.

Signed and Sealed this

Twenty-ninth Day of June, 2004

JON W. DUDAS
*Acting Director of the United States Patent and Trademark Office*